United States Patent [19]
Ezawa et al.

[11] Patent Number: 6,115,774
[45] Date of Patent: Sep. 5, 2000

[54] CONNECTOR DEVICE WITH ELECTRONIC CONTROL SWITCH FOR CONTROLLING MULTICHANNEL CIRCUIT WIRING

[75] Inventors: Genryo Ezawa, Chiba; Fumiaki Uzaki, Tokyo, both of Japan

[73] Assignee: The Whitaker Corporation, Wilmington, Del.

[21] Appl. No.: 09/108,083

[22] Filed: Jun. 30, 1998

[30] Foreign Application Priority Data

Jun. 30, 1997 [JP] Japan ................................ 9-189194

[51] Int. Cl.$^7$ ................................................. G06F 13/00
[52] U.S. Cl. ........................ 710/131; 710/100; 710/129; 710/62
[58] Field of Search ................................. 710/131, 100, 710/132, 129, 62

[56] References Cited

U.S. PATENT DOCUMENTS 5,615,344  3/1997  Corder ..................................... 710/129
5,850,564  12/1998  Ting et al. ......................... 395/800.37

*Primary Examiner*—Ario Etienne

[57] ABSTRACT

A connector device with an electronic control switch has a switching means for electronically controlling multichannel circuit wiring, and with which the switching pattern thereof can be changed with relative ease. The connector device (10) with an electronic control switch has a switch IC (44), a control IC (35) for controlling the switch IC, a flash memory device (40), and a connector (11) connected to a measurement device. The control IC (35) provides switch patterns to a plurality of switch IC's (44) on the basis of data stored in the flash memory device (40). Electrical terminals of the connector (11) are also used for rewriting the stored data in the flash memory device (40).

8 Claims, 5 Drawing Sheets

CONNECTOR DEVICE WITH ELECTRONIC CONTROL SWITCH FOR CONTROLLING MULTICHANNEL CIRCUIT WIRING

FIELD OF THE INVENTION

The present invention relates to a connector device with an electronic control switch, with which the circuit wiring between a plurality of electrical terminals of an electrical connector and the wires connected to the connector can be changed by a switch.

BACKGROUND OF THE INVENTION

An example of a connector device with a switch is disclosed in Japanese Utility Model Publication No. 4-102180. The disclosed switched connector includes a manual switch for changing the wiring governing whether or not an electrical terminal of an electrical connector is connected to a termination resistance.

Another example of a connector device with a switch is disclosed in Japanese Patent Publication No. 5-174921. The disclosed connector device includes a manual switch for turning on and off the wiring to a branch-side connector.

However, these structures that include a manual switch are not suited to the control of numerous electrical wiring lines. Rather, numerous electrical circuit wiring lines, such as multichannel circuit wiring lines, should be controlled by an electronic control means.

In addition, it is preferable for the switch pattern, which determines the wiring of a multichannel circuit such as this, to be designed so that it can be changed by programming. This is because it allows a wiring change that is appropriate to the customer's needs to be made with ease. Changing wiring is difficult when the switching means comprises manual switches as above.

Therefore, the present invention provides a connector device with an electronic control switch, which has a switching means for electronically controlling multichannel circuit wiring, and with which the switching pattern thereof can be changed with relative ease.

SUMMARY OF THE INVENTION

The present invention provides a connector device with an electronic control switch, comprising a plurality of electrical wiring lines that can be changed by the electrical switching action of switch devices, an electrical connector that is equipped with a plurality of electrical terminals that makes it possible to connect an external device at one end of the plurality of electrical wiring lines, a control device that controls the plurality of switch devices, and a memory device that provides switch control data to the control device, wherein at least one of the plurality of electrical terminals is used to rewrite the switch control data stored in the memory device.

It is preferable for the switch devices to include a switch IC, and for the control device to include a control IC.

It is also preferable for the memory device to comprise a flash memory device.

It is further preferable for the connector device with an electronic control switch to be structured such that it has a first circuit board to which a plurality of wires are connected and on which the switch IC is mounted, a second circuit board on which the control IC and the memory device are mounted, and a mother board which is connected to the first circuit board and the second circuit board, which includes the plurality of electrical terminals, and to which a connector that can be mated with a mating connector is connected, and such that the switch IC is controlled by switch control data stored in the memory device so as to determine the electrical wiring between the plurality of wires and the plurality of electrical terminals.

It is preferable for the connector to be fitted to the data rewriting-connector of a rewriting device during the rewriting of the switch control data. The connector device with an electronic control switch should include a recognition means for electrically recognizing whether the mating connector of the connector is the mating connector or the rewriting connector.

It is preferable for the recognition means to be configured in the circuit on the second circuit board.

It is preferable for a plurality of the first circuit boards to be arranged in a row parallel to each other so that they are perpendicular to the mother board, and for the second circuit boards to be arranged at a right angle to the first circuit boards and, again, perpendicular to the mother board.

It is preferable for the control IC to have a PLD (programmable logic device).

It is preferable for a CPU, which is the rewrite control IC for the switch control data, to be mounted along with the PLD, which is a control IC, on the second circuit board. The PLD performs the rewriting of the switch control data in conjunction with the CPU. The PLD is positioned more to the input side than the CPU in the circuit of the second circuit board.

It is preferable for the PLD to be actuated, and the CPU not to be actuated, when the switch control data is read from the memory device so that the switch IC is actuated, and for the PLD and the CPU both to be actuated when the switch control data is written into the memory device.

It is preferable for the PLD to extract the minimum required number of pulses from a PLD dedicated clock device, and to operate such that the PLD dedicated clock device is idled during other time periods.

BRIEF DESCRIPTION OF THE DRAWINGS

An embodiment of the present invention will not be described by way of example with reference to the accompanying drawings in which:

FIG. 2A is the surface on the mother board side, and FIG. 2B is the surface auxiliary board side.

DETAILED DESCRIPTION OF THE INVENTION

Figure 1A:
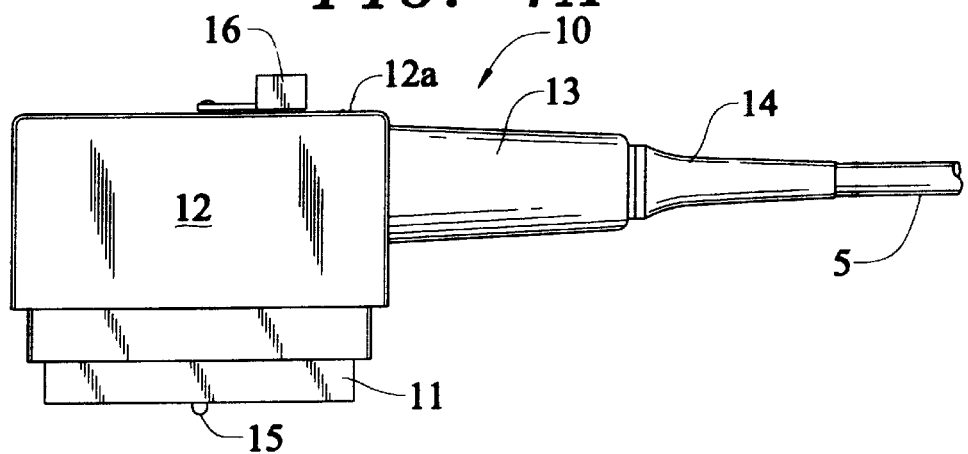
FIGS. 1A–1C show a connector device of the present invention, with FIG. 1A showing a side view, FIG. 1B being a part top plan view, and FIG. 1C being a cross-sectional view.
Figure 1B:
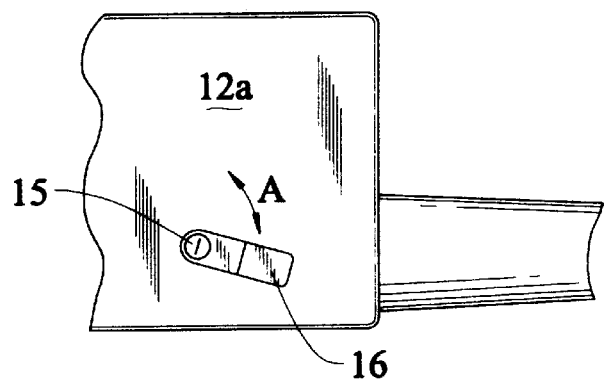
Figure 1C:
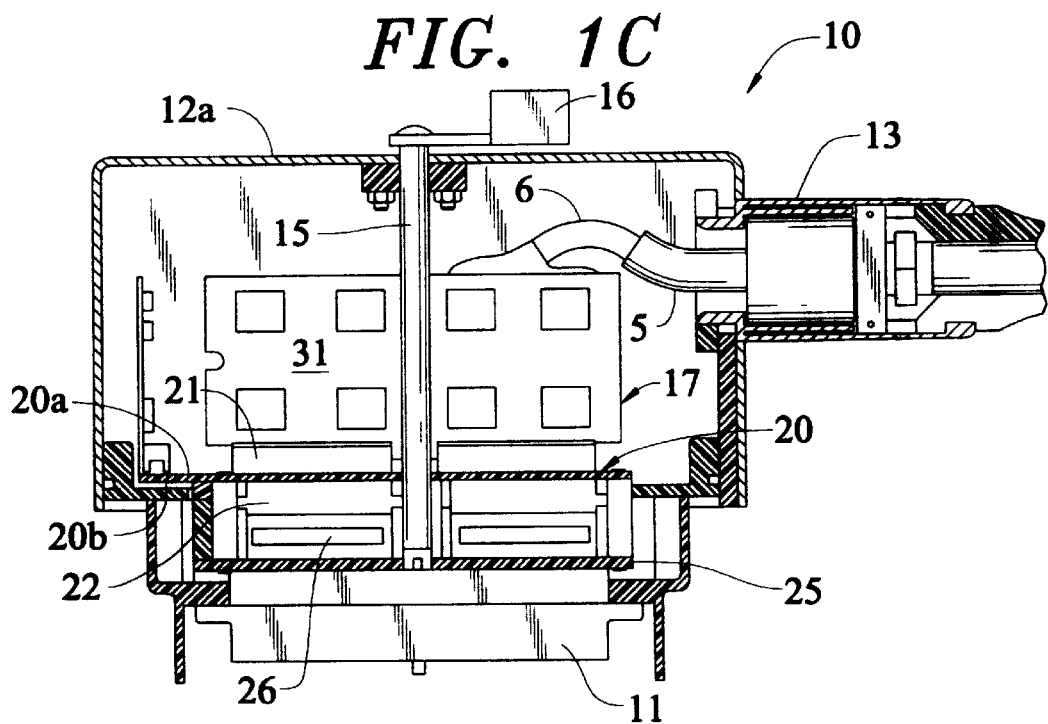

In FIGS. 1A–1C, connector device 10 pertaining to the present invention has a connector 11 designed to mate with a mating connector, a housing 12 that houses a plurality of circuit boards (discussed below), a cable support member 13 that supports a cable 5 near an end thereof, and a strain-relief member 14 for relieving stress on the cable 5. A rotatable member 15 for effecting a zero-insertion force engagement with a mating connector (not shown) is disposed on the connector 11. The rotational operation of the rotatable member 15 is accomplished by operation of a handle 16 that extends outwardly from an upper wall 12a of the housing 12. As shown in FIG. 1B, the handle 16 is able to rotate in the direction of the arrow A. Details about zero-insertion force engagement of the rotatable member 15 relative to the mating connector are disclosed in Japanese Patent Publication No. 50-12796. Although not shown, a probe member is connected to an opposite end of the cable 5. The connector device 10 is used in order to transmit signals from the probe member to a measurement device when the connector 11 is connected with a connector on the measurement device.

As shown in FIG. 1C, the connector 11 constitutes a circuit board assembly 17 along with a plurality of circuit boards inside the housing 12. The circuit board assembly 17 includes a mother board 20. Connectors 21 and 22 are mounted on either side of the mother board 20. The connector 21 on one side is connected to a plurality of circuit boards 31 that serve as daughter boards. The circuit board assembly 17 has an auxiliary board 25 on which the connector 11 is mounted. The auxiliary board 25 has a plurality of connectors 26 mounted on the opposite side from the side on which the connector 11 is mounted, such that they fit respectively with the plurality of connectors 22 on the mother board 20. Therefore, there is a circuit bus between the mother board 20 and the plurality of electrical terminals (not shown) of the connectors 26.

Figure 2A:
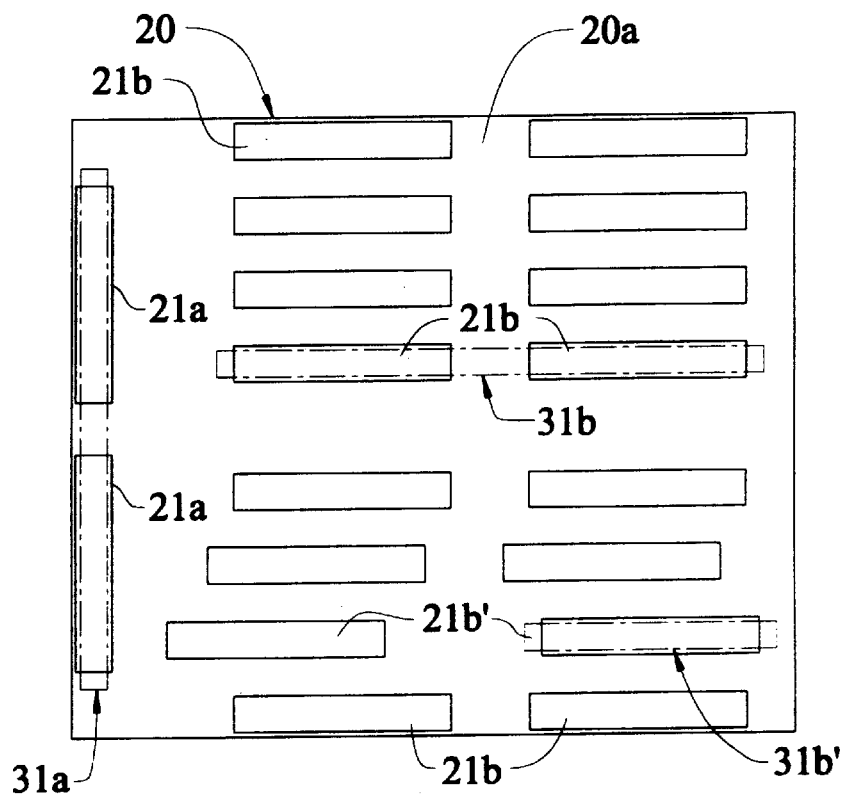
FIGS. 2A and 2B are schematic diagrams showing the connectors on the various sides of a mother board, and the imaginary positions of circuit boards connected to the connectors on one side, where

As shown in FIG. 2A, a total of eighteen connectors 21 are mounted on the side 20a of the mother board 20. As seen in FIG. 2A, of the connectors 21, a pair of connectors 21a that extend along an edge at one end of the mother board 20, and the other connectors 21b and 21b' are disposed such that they extend at right angles to one another. The connectors 21a are connected to a control board (second circuit board) 31a, and as FIG. 2A illustrates, the pair of connectors 21a is connected to the connectors at the end of a single control board 31a. The connectors 21b and 21b' are connected to switching boards (first circuit boards) 31b and 31b'. The switching boards 31b and 31b' connected to some of the connectors 21b and 21b' are depicted with imaginary lines, but as shown in FIG. 2A, the pairs made up by the connectors 21b (there are seven pairs in FIG. 2A) are connected to a single switching board 31b, and the connectors 21b' are connected to a single switching board 31b', respectively. The control board 31a and the switching boards 31b and 31b' will be described in detail below. By having the connectors 21a disposed perpendicular to the connectors 21b and 21b', the distance of circuit wiring between the control board 31a and the switching boards 31b and 31b' (that is, the distance from the connectors 21a to the connectors 21b and 21b') can be minimized.

Figure 2B:
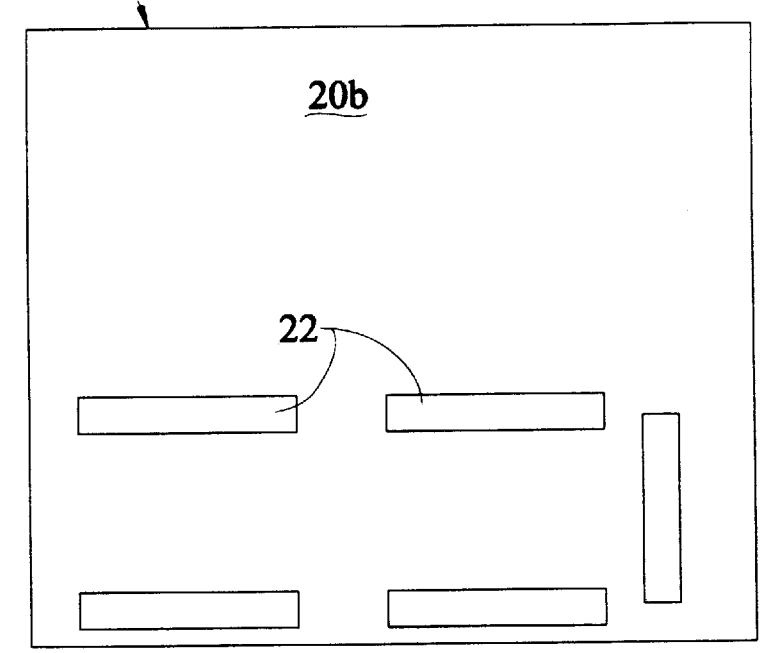

As shown in FIG. 2B, five connectors 22 are mounted on the side 20b of the mother board 20. As shown, the five connectors 22 are laid out in a generally U-shape. The five connectors 22 fit into the connectors 26 mounted on the auxiliary board 25 as discussed above, and the layout of the connectors 22 allows the auxiliary board 25 to be held in relatively good mechanical stability with respect to the mother board 20. Therefore, a stable electrical connection is maintained between the auxiliary board 25 and the mother board 20 when the connector 11 on the auxiliary board 25 is electrically connected to the mating connector as well.

Figure 3:
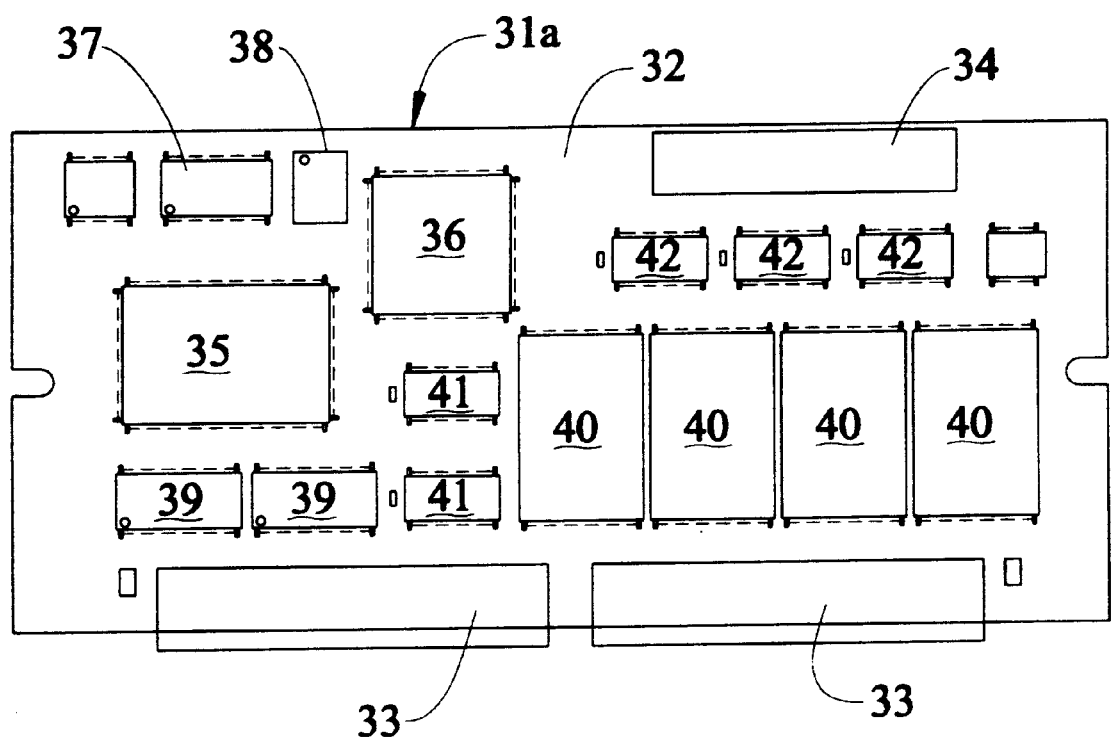
FIG. 3 is a plan view of one mounting surface of the control board.

In FIG. 3, the control board 31a has a plurality of electronic devices mounted on surface 32 thereof, in addition to connectors 33 and 34. The plurality of electronic devices include a PLD (programmable logic device) 35, a CPU (central processing unit) 36, a first clock device 37, a second clock device 38, two buffer memory devices 39, four flash memory devices 40, two first switch devices 41, and three second switch devices 42. A pair of the connectors 33 is mounted along an edge of the control board 31a. The connector 34 is mounted along an edge along an opposite side from the connectors 33. The connector 34 is used only when a program is to be stored in the CPU 36, and it is usually not connected together with the other connectors. The PLD 35 is a Mach 445-20YC supplied by AMD, a U.S. company; the CPU 36 is an HD64P3048F-16 supplied by Hitachi, Ltd. and the flash memory device 40 is an AM29F100B-75EC supplied also by AMD.

Figure 4:
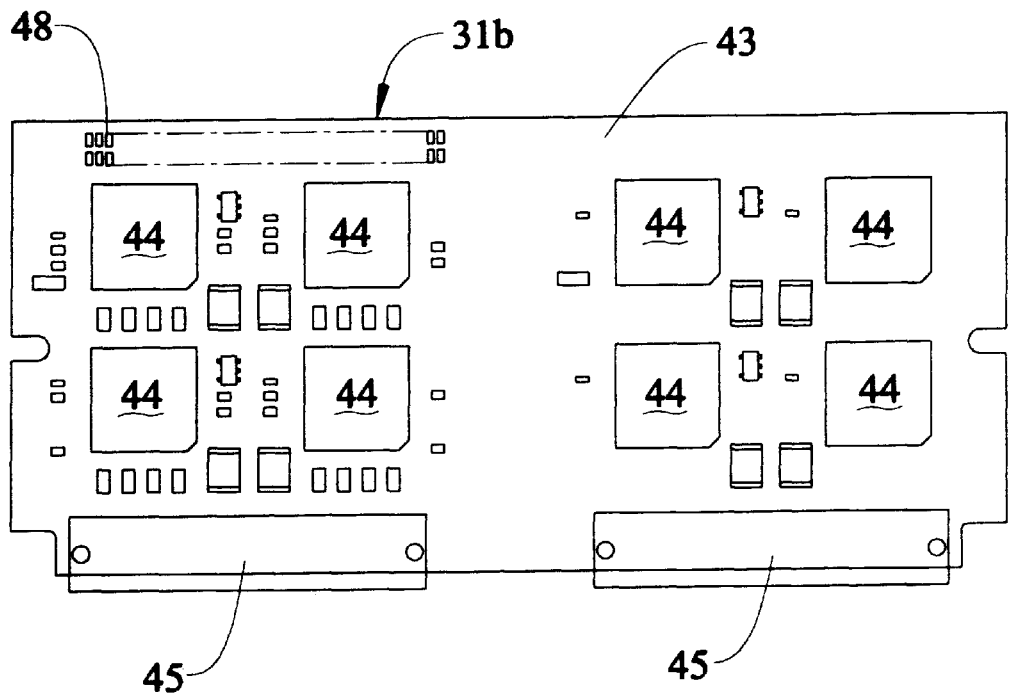
FIG. 4 is a plan view of the mounting surface of the switching board.

In FIG. 4, eight switch IC's 44 are mounted on surface 43 on one side of the switching board 31b. In addition to the switch IC's 44, capacitors, resistors, and the like are also mounted on the mounting surface 43, and these serve as filters to prevent static electricity (some of the capacitors and resistors are omitted from FIG. 4). The circuit wiring (not shown) on the mounting surface 43 forms a switch circuit by the serial pairing of switch IC's 44 that are next to each other in the lengthwise direction. (This will be described in detail below, but the switch IC's 44 are able to latch eight bits of control data, and using a pair of switch IC's 44 together allows 16 bits of control data to be latched.) A pair of connectors 45 is mounted along an edge of the switching board 31b. Each connector 45 is wired such that it is connected to two switching circuit groups made up of four switch IC's grouped close together on the mounting surface 43. The switching board 31b is a double-sided circuit board having a mounting surface on the other side as well, and the mounting surface on the other side is similarly configured. Therefore, a single switching board 31b has a total of 16 switch IC's 44 mounted on both sides, thereby forming eight switching circuits. The connectors 45 are each wired such that they are connected to a total of four switching circuit groups. The switch IC's 44 are HV20220PJ made by Super Tex.

Circuit pads 48 connected to numerous wires 6 (see FIG. 1C) extending from the cable 5 described above are located along an edge on an opposite side from where the connectors 45 are located on the switching board 31b. The purpose of the above-mentioned switching circuit groups formed by the switch IC's 44 is to make it possible to change through switch control the circuit wiring extending between the connectors 45 and the circuit pads 48. A structure such as this allows a measurement device to selectively receive just the required signals from the probe member via the wires connected to the cable 5.

The detailed structure of the switching board 31b' is not shown, but the basic operation thereof is similar to that of the switching board 31b. The difference is that there are half as many switch IC's 44 and circuit pads 48 as on the switching board 31b, and only one connector 45 is mounted thereon. Specifically, the switching board 31b' is structured such that half as many signal circuit wiring lines can be switch-controlled as on the switching board 31b.

Figure 5:
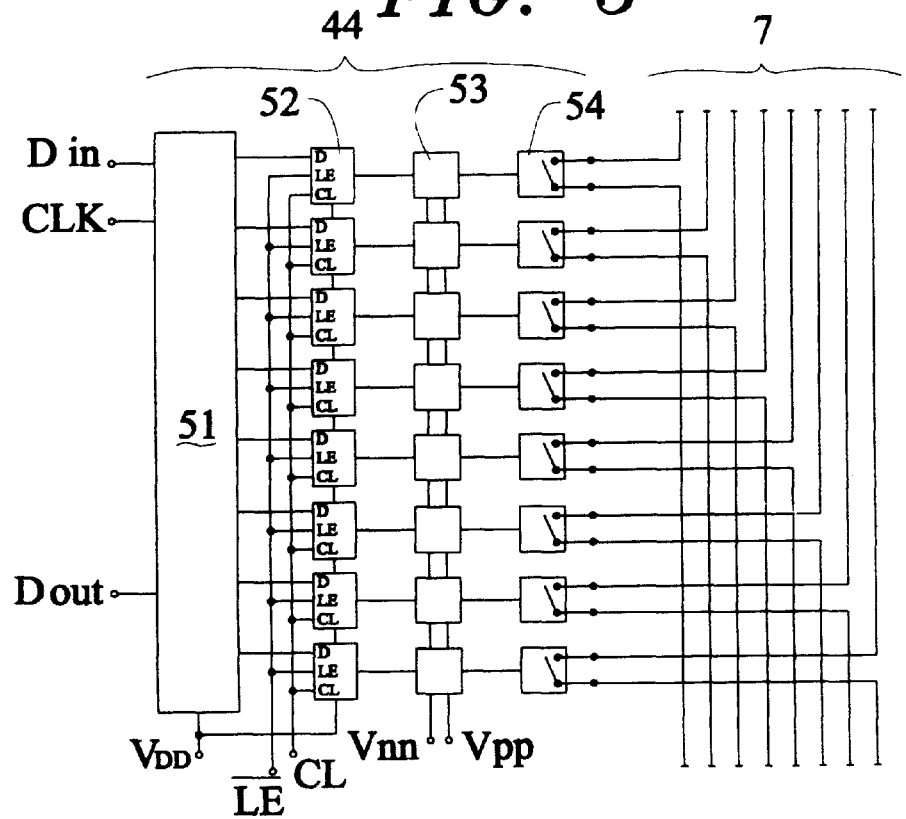
FIG. 5 is a schematic diagram of the switching action of a switching IC.
Figure 6:
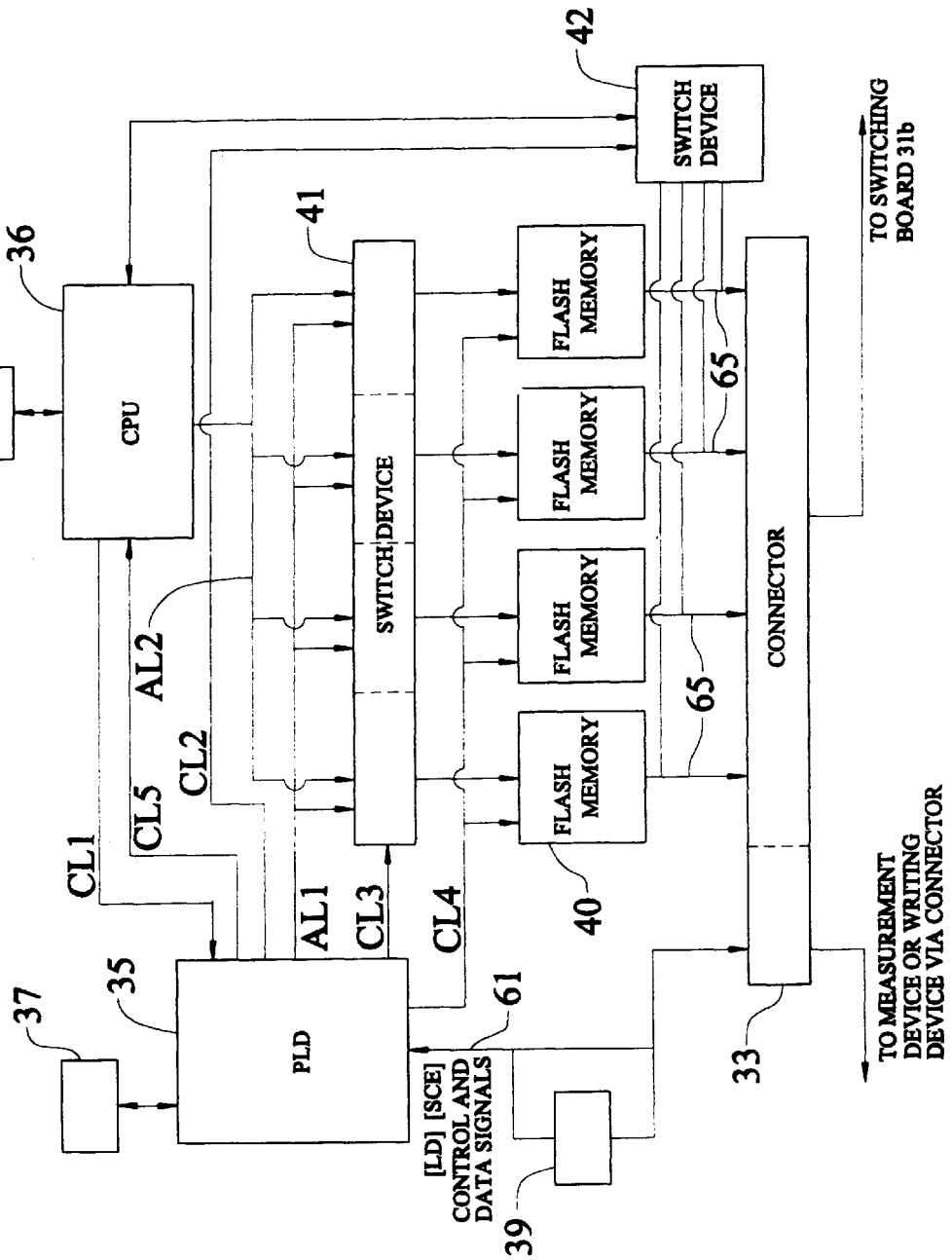
FIG. 6 is a schematic diagram of a circuit on a control board for achieving a switching action.

In FIG. 5, the switch IC (switching device) 44 has built into it a shift register 51, latch circuits 52, level shift circuits 53, and switches 54. As shown in FIG. 5, the operation of the shift register is synchronized with a clock inputted at a CLK terminal, and eight or fewer bits of data inputted from a D in terminal are stored, which can be latched and maintained by the latch circuits 52. The latched potential level determines the opening and closing of the eight switches 54. The level shift circuits 53 serve to convert the potential level according to the voltage of the signal to be switched. As mentioned above, a pair of the switch IC's 44 in serial arrangement make up a single switching circuit. That is, a D out terminal of one switch IC 44 is connected to the D in terminal of the other switch IC. Therefore, a pair of switch IC's (that is, a single switching circuit) provides sixteen on/off switches 54 that respectively control sixteen signal-use circuit wiring lines 7.

The specific action of the switch control will now be described. First, the action when the connector device 10 is connected to a connector on the measurement device side (not shown) will be described, and a measurement signal from the probe member is switch-controlled and received by the measurement device. The first step in the switch control is the provision of a control signal from the measurement device to the connector device 10. The control signal is transmitted to a plurality of channels 61. The PLD 35 includes an LD terminal and an SCE terminal connected to two specific channels out of the plurality of channels 61. Both of these terminals are ordinarily set at a high level. When the measurement device sends a control signal, a time-shifted low pulse is transmitted to the two terminals LD and SCE via channels 61. As a result of being provided with the pulse data, the PLD 35 is able to recognize that the connector device 10 is connected to the connector on the measurement device side. At this point the PLD 35 sets the first switch device 41 such that the address signal sent from the PLD is sent to the flash memory devices 40 (control line CL3). The second switch device 42 is not actuated at this time. Therefore, as will be discussed below, the setting is such that the switch control data provided from the flash memory devices 40 is sent just to the connector 33. The PLD 35 further sets the flash memory devices 40 to a read mode (control line CL4).

The PLD 35 obtains sixteen pulses by actuation of a first clock device 37. After the pulses have been obtained, the first clock device 37 is again idled. The purpose of this is to prevent noise with respect to the measurement signal. The PLD 35 sends address signals to the flash memory devices 40 via the first switch devices 41 on the basis of the sixteen pulses that have been obtained. Sixteen common address signals are sent in parallel through an address line AL1 to the four flash memory devices 40. The flash memory devices 40 send out stored switch control data on the basis of the obtained address signals. One of the flash memory devices 40 sends out switch control data from each of the sixteen terminal locations for one address signal from one terminal at a time (sixteen bits of data), so the four flash memory devices 40 are able to send out a total of 1024 bits of data. Referring to FIG. 3, the switch control data can be seen to be sent to the various switch circuits on the switching boards 31$b$ and 31$b'$ through the connectors 33, the circuit on the mother board 20, the connectors 21 and 21$b'$, and the connectors 45 of the switching boards 31$b$ and 31$b'$ fitting therein.

As discussed above, each of the various switch circuits comprising a pair of switch IC's of the switching boards 31$b$ and 31$b'$ requires sixteen bits of data, and the wiring of the circuit boards and connectors is designed such that sixteen bits of data will be obtained from one specific terminal of a specific flash memory device 40. The structure is also such that the data obtained from the eight terminals of specific flash memory devices 40 is utilized for the switching board 31$b$, and the data obtained from the four terminals of specific flash memory devices 40 is utilized for the switching board 31$b'$.

Switch control is carried out as above on the switching boards 31$b$ and 31$b'$ on the basis of the signals provided from the measurement device, thereby allowing proper measurement to be conducted. If the type of measurement has already been decided, usable switch patterns can be stored ahead of time in the flash memory devices 40, and measurement can be conducted by providing the flash memory devices 40 with address signals that can provide these switch patterns from the measurement device. However, there are cases that are not suited to pre-stored switch patterns, and in a case such as this, the stored data of the flash memory devices 40 must be rewritten. The rewriting of the stored data of the flash memory devices 40 will now be described.

In the rewriting of the stored data of the flash memory devices 40, the connector 11 is disconnected from the connector on the measurement device side and connected to a connector on the dedicated writing device side (not shown). One of the advantages of the structure of the connector device 10 is that the connector 11 connected to the terminal of the measurement device side connector and used for the transmission of the electrical signals can be used just as it is for data rewriting. Here, low pulse signals are provided simultaneously from the writing device (not shown) to the LD terminal and the SCE terminal connected to two specific channels of the above-mentioned plurality of channels, which allows the PLD 35 to recognize that the connector 11 is connected to the writing device. At this point the PLD 35 sets the first switch devices 41 such that the address signals from the CPU 36, rather than from the PLD 35, will be provided to the flash memory devices 40 (control line CL3). The PLD 35 activates a second clock device 38 and the CPU 36 that had been idle (control line CL5). The activated CPU 36 sets the flash memory devices 40 to a write mode via the PLD 35 (control line CL4).

The activated CPU 36 performs interface between the external writing device and the flash memory devices 40 via the PLD 35. The program for this interface is written to the CPU 36 ahead of time. The CPU 36 activates the second switch device 42 via the PLD 35 (control lines CL1 and CL2), and is set such that writing data signals from the CPU 36 are sent to a plurality of buses 65 that usually serve as transmission buses for switching control data to the connector 33. The data signals are provided from the data line DL1. The writing of data is carried out for each of the flash memory devices 40 in order, one at a time. In the control line CL2, the specified address of the specified flash memory device 40 is estimated by means of the address signals and control signals provided to the address line AL2, and data is stored in this location.

Furthermore, the circuit is designed such that the writing device will be able to read the data stored as above in order to check the data. Here, the CPU 36 resets the flash memory devices 40 to a read mode via the PLD 35. After this, the specified address of the specified flash memory device 40 can be selected via the control line CL2 and the address line AL2, and the data stored at that location can be read via the data line DL1. The read data can be confirmed from the outside by sending it to a writing device via the bus 61.

After the stored data has thus been rewritten, the connector device 10 can be re-connected to the connector of the measurement device, and the required measurement can be performed by performing switch control by means of a suitable address.

The connector device of the present invention with an electronic control switch described above is nothing more than an example, and is not intended to limit the present invention, which can be variously modified by a person skilled in the art.

The connector device with an electronic control switch of the present invention comprises a plurality of electrical wiring lines that can be changed by the electrical switching action of switch devices, an electrical connector that is equipped with a plurality of electrical terminals and that makes it possible to connect an external device at one end of the plurality of electrical wiring lines, a control device that controls the switch devices, and a memory device that provides switch control data to the control device, wherein at least one of the plurality of terminals is used to rewrite the switch control data stored in the memory device. This allows the switch control of multichannel circuit wiring to be performed easily and reliably. A particular advantage is that numerous switch patterns can be easily accommodated by the same hardware. Also, since the rewriting of switch control data of the memory device is relatively simple, and since the terminal of the connector used in the connection with an external device can be used without modification, the connector device need not be provided with extra space for connection or extra terminals. Another advantage is that no need is required to disassemble the connector device for the rewriting of the memory device.

What is claimed is:

1. A connector device comprising:
   a plurality of electrical wiring lines electrically connected to a plurality of switch devices;
   an electrical connector having a plurality of electrical terminals for electrical connection of the plurality of electrical wiring lines to an external device;
   a control device for electronically controlling the plurality of switch devices, wherein the control device includes a programmable logic device, a central processing unit, first and second clock devices, buffer memory devices, flash memory devices, and first and second switch devices; and
   a memory device for providing switch control data to the control device, wherein at least one of the plurality of electrical terminals is used to rewrite the switch control data stored in the memory device.

2. A connector device as claimed in claim 1, wherein the plurality of switch devices comprises switch IC's.

3. A connector device as claimed in claim 1, wherein the control device includes a control IC.

4. A connector device as claimed in claim 1, wherein the memory device comprises flash memory devices.

5. A connector device as claimed in claim 1, wherein a first circuit board is provided to which the plurality of electrical wiring lines are connected and on which the plurality of switch devices are mounted.

6. A connector device as claimed in claim 1, wherein a second circuit board is provided on which the control device and the memory device are mounted.

7. A connector device as claimed in claim 2, wherein each of the switch IC's includes a shift register, latch circuits connected to said shift register, level shift circuits connected to said latch circuits, and switches connected to said level shift circuits.

8. A connector device as claimed in claim 1, wherein the central processing unit is used to rewrite the switch control data.

* * * * *